United States Patent
Sia et al.

(10) Patent No.: US 9,672,353 B2
(45) Date of Patent: Jun. 6, 2017

(54) SECURING AND MANAGING APPS ON A DEVICE USING POLICY GATES

(71) Applicant: Blue Cedar Networks, Inc., San Francisco, CA (US)

(72) Inventors: Barry Earl Angeles Sia, Belmont, CA (US); Erik L. Peterson, Vallejo, CA (US)

(73) Assignee: Blue Cedar Networks, Inc., San Francisco, CA (US)

( * ) Notice: Subject to any disclaimer, the term of this patent is extended or adjusted under 35 U.S.C. 154(b) by 98 days.

(21) Appl. No.: 14/697,873

(22) Filed: Apr. 28, 2015

(65) Prior Publication Data
US 2015/0310210 A1    Oct. 29, 2015

Related U.S. Application Data

(60) Provisional application No. 61/985,202, filed on Apr. 28, 2014.

(51) Int. Cl.
| | | |
|---|---|---|
| *G06F 21/54* | (2013.01) | |
| *H04L 29/06* | (2006.01) | |
| *H04W 4/02* | (2009.01) | |
| *H04W 64/00* | (2009.01) | |
| *H04W 12/08* | (2009.01) | |
| *H04W 12/12* | (2009.01) | |
| *H04W 4/00* | (2009.01) | |

(52) U.S. Cl.
CPC .......... *G06F 21/54* (2013.01); *H04W 4/003* (2013.01); *H04W 4/021* (2013.01); *H04W 12/08* (2013.01); *G06F 2221/033* (2013.01); *H04L 63/126* (2013.01); *H04W 12/12* (2013.01)

(58) Field of Classification Search
CPC .. G06F 21/54; G06F 2221/033; H04W 4/021; H04W 4/003; H04W 12/08; H04W 12/12; H04L 63/126
USPC .......................................................... 726/1
See application file for complete search history.

(56) References Cited

U.S. PATENT DOCUMENTS

| | | |
|---|---|---|
| 7,941,700 B2 | 5/2011 | Schlesinger et al. |
| 8,190,785 B2 | 5/2012 | Hill et al. |

(Continued)

OTHER PUBLICATIONS

Matt Hamblen, "New Version of Mobile Management Released by MobileIron," Computerworld Online, http://www.computerworld.com/s/article/9184159/New_version_of_mobile_management_released_by_MobileIron, Sep. 9, 2010.

(Continued)

*Primary Examiner* — Kambiz Zand
*Assistant Examiner* — Benjamin Kaplan
(74) *Attorney, Agent, or Firm* — Kwan & Olynick LLP

(57) ABSTRACT

A method of securing an app for execution on a device using an app security program with policy gates is described. First, Java class files are generated for the app security program, where the generating is dictated by a plurality of app security policies located in a plurality of policy gates. The plurality of policy gates are managed by a policy gate manager. Next, Java class files are replaced for the app with the Java class files for the app security program. Third, a security-wrapped app is created upon completion of replacing the Java class files for the app. Further, the security-wrapped app is prepared for execution on the device. Last, the security-wrapped app is re-signed with a new key.

15 Claims, 9 Drawing Sheets

(56) References Cited

U.S. PATENT DOCUMENTS

| | | |
|---|---|---|
| 8,549,656 B2 | 10/2013 | Blaisdell et al. |
| 2006/0271921 A1 | 11/2006 | Cronce et al. |
| 2007/0106958 A1 | 5/2007 | Kumashio |
| 2007/0136207 A1 | 6/2007 | Davydov |
| 2007/0192864 A1 | 8/2007 | Bryant et al. |
| 2007/0245409 A1 | 10/2007 | Harris et al. |
| 2008/0047023 A1 | 2/2008 | Lam et al. |
| 2011/0239306 A1 | 9/2011 | Avni et al. |
| 2012/0259909 A1 | 10/2012 | Bachelor et al. |
| 2014/0137184 A1* | 5/2014 | Russello ................. G06F 21/60 726/1 |

OTHER PUBLICATIONS

Nukona App Center, "Everything You Need to Secure, Deploy and Manage Your Apps on Personal Devices", https://www.nukona.com/products, Jul. 7, 2011.

Good Technology, Inc., "Taking Secure Steps to Enterprise Mobility—On the Most Popular Devices", http://www.good.com/products, Jul. 7, 2011.

Lookout Mobile Security, https://www.mylookout.com/download, Apr. 2010.

Android Community, "Amazon App Store Lures You in With Free Apps, Makes You Stay if You Want to Keep Them", http://androidcommunity.com/amazon-app-store-lures-you-in-with-free-apps-makes-you-stay-if-you-want-to-keep-them-20110614/?utm_medium=referral&utm_source=pulsenews, pp. 1-2 , Jul. 13, 2011.

International Search Report dated May 23, 2012 from International Application No. PCT/US 12/24080.

Written Opinion dated May 23, 2012 from International Application No. PCT/US12/24080.

* cited by examiner

SECURING AND MANAGING APPS ON A DEVICE USING POLICY GATES

CROSS-REFERENCE TO RELATED APPLICATIONS

This Application claims priority to U.S. Provisional Patent Application No. 61/985,202, filed on Apr. 28, 2014, the contents of which are incorporated herein by reference in their entirety.

BACKGROUND OF THE INVENTION

1. Field of the Invention

The present invention relates to software and mobile devices. More specifically, it relates to securing, governing, and managing apps on devices, such as handsets, televisions, automobiles, and other emerging smart device categories.

2. Description of the Related Art

As is now known in the computing and mobile handset and smartphone industries, a new computing paradigm is emerging and is being driven by the proliferation of software applications now commonly known as apps for handheld or mobile devices. This proliferation is directly tied to consumer adoption of smartphones and tablets. Enterprises are now creating their own unique apps and distributing them to employees, customers, and partners. Companies are now writing their own apps for their employees and partners to use. However, with this growth another problem is arising, namely, the security and management of these apps on handset devices. Apps can cause significant damage to a handheld device and can cause loss of data or unintended transmission of data. They pose vulnerabilities for the device and a security risk for the user.

Traditional anti-virus approach, such as provided by MyLookOut, does not remove damage done by an app on a handset device. While black listing of apps is partially adequate for protecting devices (not only apps on the list to be downloaded), it would be better if there was a method to contain damage that a malware-infected app has done on a mobile device. It would be preferred if the kernel of the operating system software for the mobile device did not have to be altered. It would also be preferred if the app author did not have to be trained in the art of secure programming, or write anything special or customized for security when writing the app—they should be able to simply continue writing apps as they are currently doing.

SUMMARY OF THE INVENTION

In one aspect of the present invention, apps are secured or security-wrapped either before they are downloaded onto a device, such as a smartphone or tablet device, or after they are downloaded but before they are allowed to access the device operating system and cause any potential damage. An app provider, such as an employer or a wireless cellphone provider, can secure its apps before consumers download an app from their app store, marketplace, and the like. The app is secured before it is allowed to access the operating system or other components of the device, thereby preventing the app from malicious behavior on the device.

In one aspect of the invention, a method of securing an app for execution on a device using a security program is described. Core object code of the app is obtained and the digital signature is removed. App object code is substituted with security program object code, thereby creating a security-wrapped app. The security-wrapped app is prepared for execution on the device and is re-signed with a new key. In this manner a centralized policy to control and secure access to data is implemented on the device.

In another aspect of the invention, a method of preventing an app from damaging a device is described. A security-wrapped app executes on the device. A security check by an app security program is applied to a call made the app to the operating system of the device. Based on the results of the security check to the call, the app security program performs one of the following: (a) allowing the call to pass to the operating system; (b) enhancing the call; (c) blocking the call; or (d) terminating execution of the security-wrapped app.

In another aspect of the invention, a method of securing an app for execution on a device using an app security program with policy gates is described. The method includes generating Java class files for the app security program, where the generating is dictated by a plurality of app security policies separate from the app security program and located in a plurality of policy gates. Each policy gate includes at least one app security policy. The plurality of policy gates are managed by a policy gate manager. The method further includes replacing Java class files for the app with the Java class files for the app security program, where the Java class files for the app that are being replaced function as a proxy between the app and a device operating system. Next, the method includes creating a security-wrapped app upon completion of said replacing of Java class files for the app. In addition, the method continues with preparing the security-wrapped app for execution on the device. Last, the method concludes with re-signing the security-wrapped app with a new key.

In other aspects of the invention, a system and non-transitory computer readable medium for implementing the methods described above are presented.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1A:
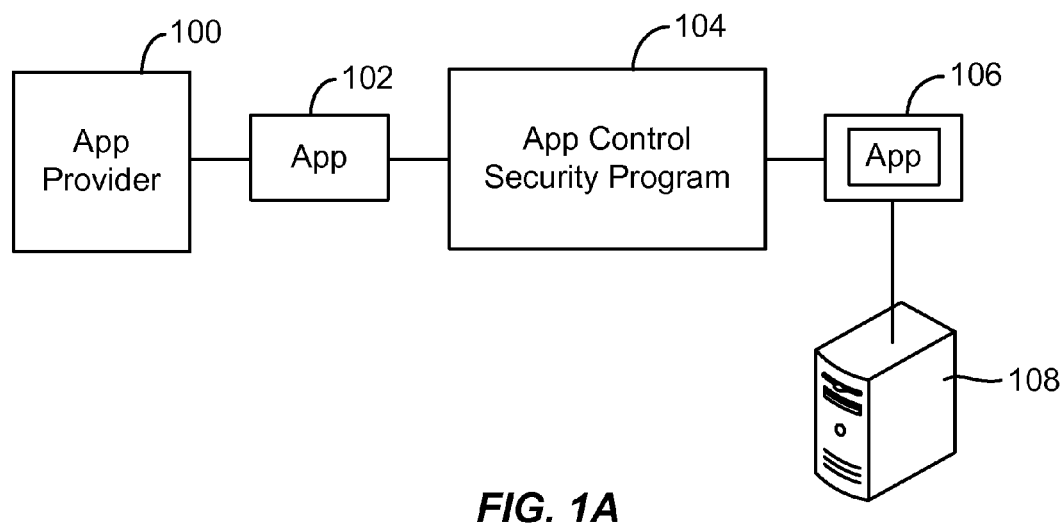
FIG. 1A is a block diagram showing an overview of the app control process of the present invention.

Example embodiments of an application security process and system are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for preventing device software applications from infecting or otherwise damaging a device, in particular, a mobile device, are described in the various figures. These types of applications, used often on a variety of mobile devices, such as smart phones, tablet computers, gaming devices, and portable computing devices are commonly referred to as "apps." These apps may also be downloaded on to non-mobile devices, such as TVs, computers, automobiles, and other emerging smart device categories. Methods and systems described are not intended to be limited to operation on mobile devices. These device programs or apps have proliferated and are now very prevalent. Currently, apps are typically written in either Java or C. The methods and systems described herein may be applied to apps written in either or to apps written in other languages for different platforms. Most apps, if not all, have to communicate with the mobile device's operating system to get a specific service that the app needs in order to perform its intended function and this service is usually only available from the operating system. A common example of such a service used is GPS to get the location of the device which the app may need. However, because of this exposure, apps are a vulnerability for the device and pose a security and privacy risk for the user. Companies want to be able enforce a centralized policy to control and secure access to its data and software. This is also true for end users (i.e., individuals, home users, and the like). It enables enterprise IT departments to maintain governance of corporate data. The methods described below provide a centralized way to control security with respect to apps that are downloaded onto mobile devices, where the devices are either an employee's personal phone or an employer's phone, so that those apps do not pose a security threat. Various embodiments of the invention may also be used by parents and individuals (i.e., in home or non-work environments) to ensure that their personal mobile devices are safe from malware and may also be used to apply controls, such as on usage. Embodiments of the app control software of the present invention may also be used for mobile device data protection and back-up and for application-level telemetry.

FIG. 1A is a block diagram showing an overview of the app control process of the present invention. It is a generic description of one process without being tied to a specific configuration or environment. An app 102 is provided by app provider 100 which can be any type of entity (individual, software developer, employer, etc.). It is generally unprotected and the only security surrounding it is provided by the operating system. The only shield and checking done on how it executes on the device once loaded is provided by the operating system.

The present invention enables additional security of the apps that is not provided by the device's operating system. A security application program 104 is applied to app 102. Or the app 102 is input to program 104, which may be supplied by a third-party app security provider. In one embodiment, security application program 104 has a policy manager and a policy wrapper which may be in different locations. They are described in greater detail in FIG. 2. Once security program 104 has been applied to app 102, the app is wrapped with a security layer so that the device is protected. It is shown as secured app 106. In one embodiment, secured app 106 is then downloaded onto a mobile device 108, such as a smart phone or tablet computer, where it executes securely without risking damage to device 108. Another benefit is that secured app 106 may also be managed by the company or other entity that is providing the app to the user, such as an employer providing the app to an employee. For example, if the user leaves the company, the company may automatically delete the app and any related data from the device. In another example, a parent may be able to limit the apps used by another person (e.g., a child) or to limit the amount of time, e.g., 10 minutes a day or limit which Web sites may be accessed by an app. Or, a parent is concerned that an app is leaking a child's location to unknown third parties. There may be numerous other examples. As noted, FIG. 1A is intended to show the general process of securing an app and downloading it onto a device. Note that in this embodiment, app 102 is not made secure from causing harm to the device after it is downloaded onto the device, but before. In another embodiment, the app is secured after it is downloaded onto the device, but before it can interact with the operating system.

Figure 1B:
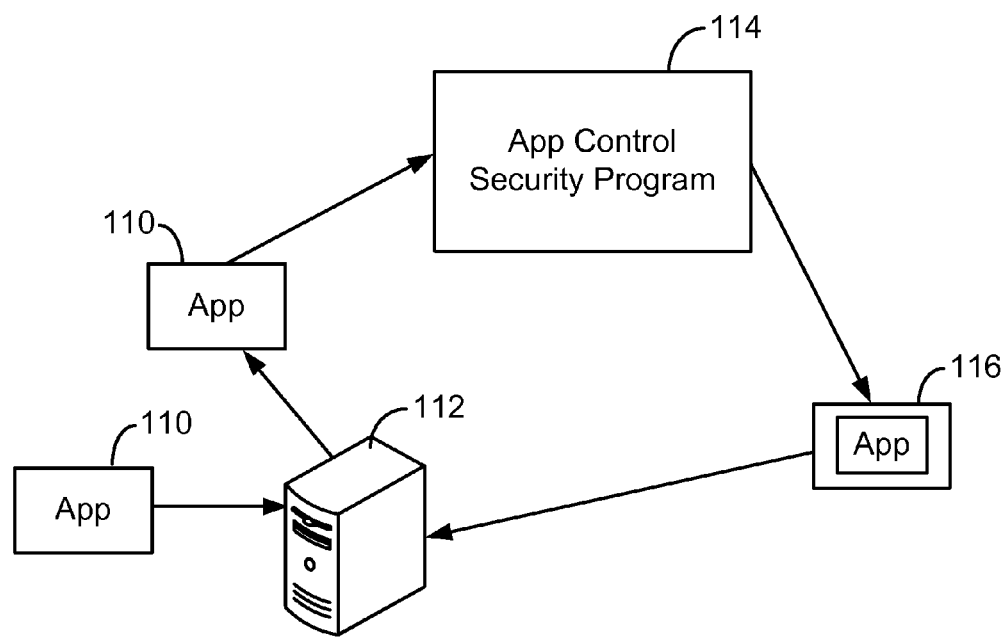
FIG. 1B is a block diagram showing an alternative embodiment of an app control process of the present invention.

FIG. 1B is a block diagram showing an alternative embodiment. An unsecured app 110 (also supplied by an app provider) is downloaded onto mobile device 112. In this embodiment, however, there may be a specially designed app on device 112 that blocks the actual installation of unsecured app 110. The special app (not shown) redirects unsecured app 110 to an app security program 114. The unsecured app 110 is wrapped in a security policy, the resulting app shown as secured app 116. It is then downloaded and allowed to be installed on device 112 by the special app. In this manner, an individual or home user, for example, who wants to protect her phone from security threats posed by apps, can have apps made secure (wrapped) by a third-party service or by her mobile phone carrier, to mention only two examples, before they are downloaded on to her phone. It should be noted that this security wrapping can be done to an app regardless of where the user downloads the app from. It may also be noted that in FIGS. 1A and 1B, the network and connections between the components and software are shown generically. The transmissions are primarily over the Internet (not shown) but may also be within a private network or both.

Figure 2:
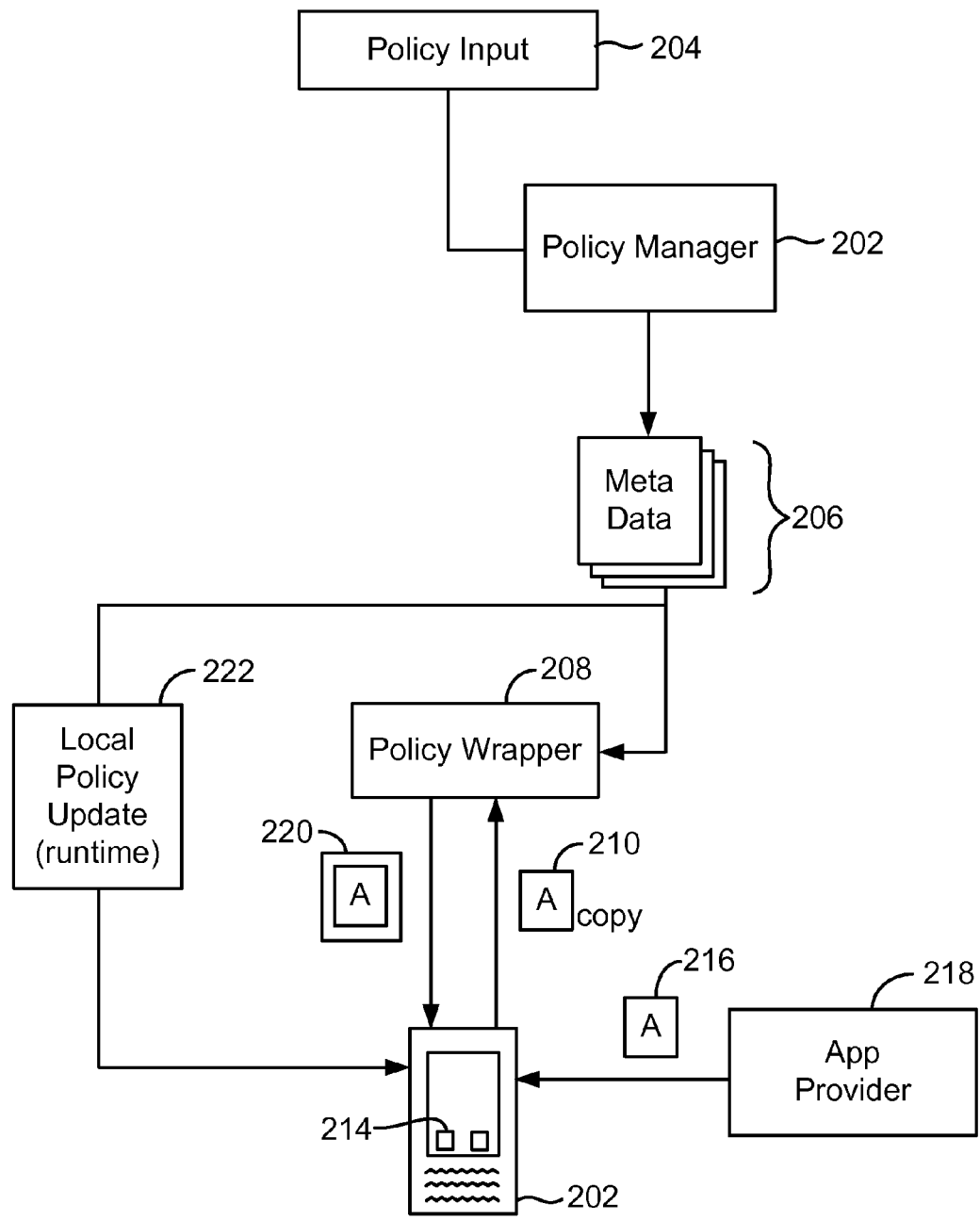
FIG. 2 is a block diagram showing components of an app security program in accordance with one embodiment of the present invention.

FIG. 2 is a block diagram showing components of an app security program in accordance with one embodiment of the present invention. In one embodiment, the security program has two major components, a policy manager and a policy wrapper. A policy manager 202 accepts input from an administrator or other individual who is responsible for setting security for the mobile device. The person may be referred to as the governor since he is governing the security of the one or more mobile devices. The security policy may be set using various user interface screens. There are numerous examples of policies, including geo-fencing (e.g., the app can only be used in a building) and others. The service provider or the entity providing the app security program may also provide default policy and security settings which may be useful for home users. Examples of policy settings are described below. Policy input 204 is inputted into policy manager 202. Policy manager 202 takes the input/settings from the governor and creates policies or meta-data 206. The format or form of meta-data 206 can vary. They essentially reflect the policy settings from the governor.

Metadata (policies) 206 may be used as input to a policy wrapper 208. In one embodiment, this component of the program takes the policies and uses them to secure an app 210 by wrapping it. Wrapper 208 receives an app 210 from a handheld device 212. In one embodiment, wrapper 208 receives a copy of an app 210 instead of the original app 214 that was downloaded onto phone 212 (see FIG. 1B above). Here the handheld device 212 user attempts to download an unsecured app 216 from an app provider 218. In the scenario in described in FIG. 1A, it may operate on the app itself instead of a copy. This may be the case where a market place or app store offers customers a secured version of the app along with an unsecured version (or only offer the secured version). A secured version 220 (security-wrapped version) is returned from policy wrapper 208 to device 212.

Metadata 206 may also be used to update a local policy file (an existing policy that is already on the device). A local policy file is used to update policy parameters residing on device 212. For example, in the case of "geofencing" (i.e., restricting use of an app to an certain physical areas) it is likely that the GPS locations controlled by the governor will change over time. When such a change occurs, the new policies can be applied in two different ways. One is to generate a new policy and apply it to the original app (i.e., wrap the app with the new policy). Another way is to allow dynamic configuration based on a local policy data file with the "variable" part of the policy encrypted/signed inside it. For example, an IT person may want the ability to override a configuration on a device directly through an IT app residing on the device for diagnostic purposes.

In one embodiment policies have two components: a fixed part and a variable part. The fixed part is the content described in the policy file (e.g., "protect the GPS at certain times of day"). The variable part typically is provided by the governor through a console (e.g. "what are the times when the GPS should be protected?"). The variable part can change without applying a new policy.

Policy designers can choose to forego the variable component of the policy and basically "embed" all data or content statically in the policy file. In this case, the console does not have any way to customize the policy.

If the policy designer chooses to include some variable component in the policy, when changes are made to the variable data (on the console), a new data file could be sent to the device to reflect the latest changes. Such a file would be encrypted/signed (to prevent a malicious app circumventing the policy), downloaded to the device, and used by the app security code on the device to apply the new data to the appropriate policy.

Such changes and updates may be done by local policy update component 222 at runtime. This component creates updated policy parameters on device 212. Thereafter, wrapped app 220 will use the updated policy parameters.

In one embodiment, policy manager 202 and policy wrapper 208 are components in the same app security program and may operate on the same computer. In other embodiments, the manager and wrapper components may be on separate computers. For example, the policy manager 202 may be on a server at one site and the policy wrapper 208 may be on a computer at another site and may be managed by a different entity or the same entity. Collectively the manager and wrapper form the app security program which, in one embodiment, is operated by a security service provider. It may also be provided by an enterprise, such as a company, employer, business partner, and the like, or by a mobile phone carrier.

Figure 3:
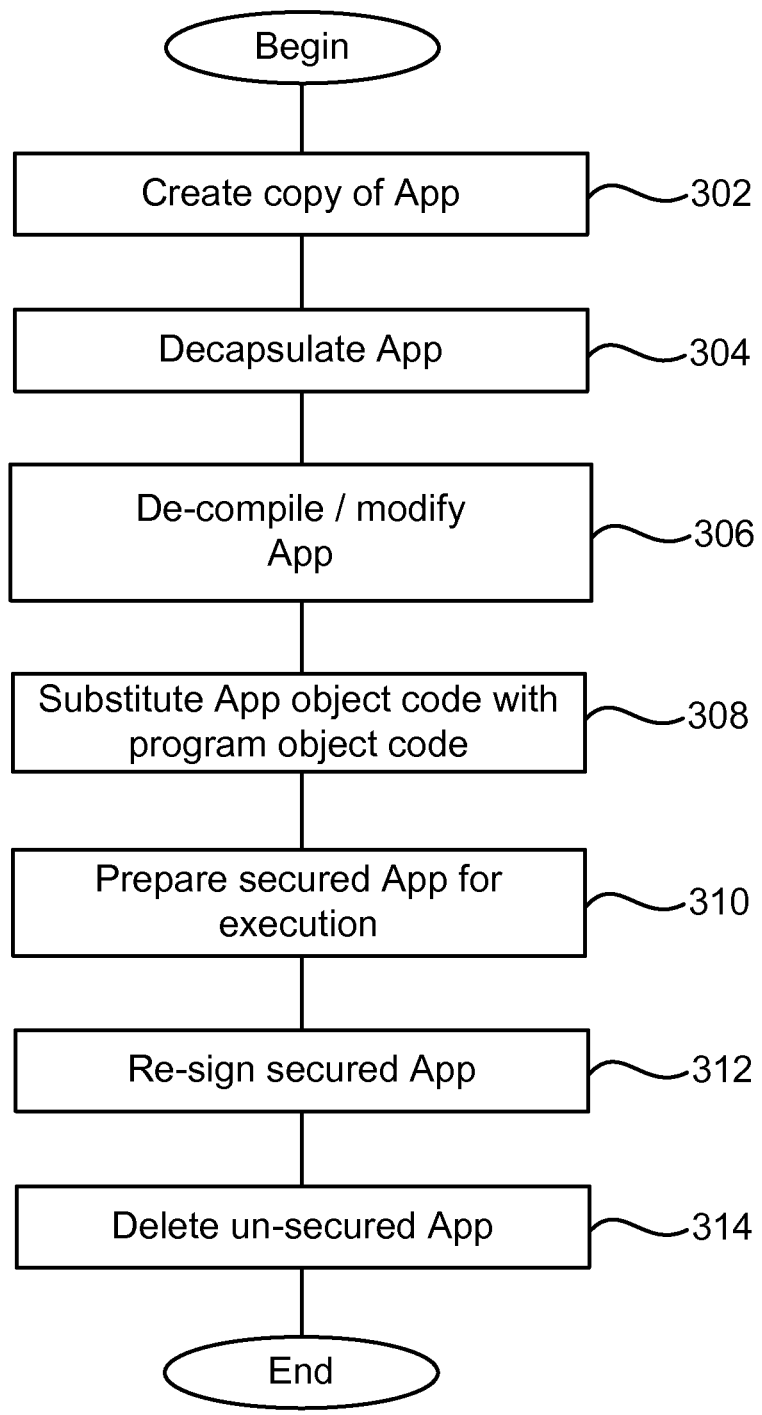
FIG. 3 is a flow diagram showing a process of making an app secure before downloading it on to a device in accordance with one embodiment of the present invention.

FIG. 3 is a flow diagram showing a process of making an app secure before downloading it on to a device in accordance with one embodiment of the present invention. At step 302 a copy or clone of the app that is to be secured is made on the device. In one embodiment, this may be done on the mobile device itself or may be done off the device, for example, on components on the Internet, in the cloud, on an enterprise's server or on a carrier server. The user may be an individual, an employee of a company or other entity. As is known in the field, an app may be obtained in a number of ways, most typically from an app store or an app market, or directly from the app developer or provider or in any suitable manner. By making a copy, the original app is preserved giving the user an option to use either the secured or unsecured version and also protects the user's ability to use the app if something goes wrong with the app control process. Note that in one embodiment, the app is not yet downloaded on to the phone. In one embodiment, the methods described below are performed on separate computing devices. In another embodiment, the process may be performed on a mobile device, but the app is only executed on the device after the process is complete and the app has been made secure.

At step 304 the app is decapsulated. Most, if not all, apps have digital signatures signed by the author/developer. At step 304, as part of the decapsulation, the digital signature is removed from the app. This may be done using techniques known in the art. Decrypting the app may also be performed at this step. These and other steps provide the core object code of the app which may now be operated on by the app control program. The nature and specifics of this operation may depend on the mobile device's operating system.

There are several examples of operating systems for smart phones such as iOS (for the iPhone), Android (used on handsets from various manufacturers), Windows Mobile 7, Web O/S, Palm, and others. At step 306, the core object code app may be either disassembled or decompiled to obtain the executable object code. For example, it can be either "native code" (CPU instructions) or bytecode (virtual machine instructions, such as Java or .Net). In one embodiment, this may be more of a modification process if the device runs iOS where the disassembly is closer to a process of locating and substituting certain links and terms. However, in general, the disassembly process to obtain the object code of an app after it has been decapsulated may be done using techniques known in the art, such as using disassemblers.

At step 308 the app object code is augmented with object code from the app security program. For example, this object code may include class files which are replaced with class files from the security program. The object code generally provides an interface to the mobile device operating system. The app control security program object code is derived, in part, from the policy/meta-data described above. In the case of iOS, the operation is different in that a 'locate and substitute' process occurs rather than an object code replacement. This takes into consideration an interrupt approach that iOS's uses. Generally, the app security program goes through the assembly language code. The specific items located are Software Interrupts (SWIs) within the object code and which are replaced with a branch to an app control security program layer which may then determine what further actions to take, such as making the request, enhancing the results, and others, as described below.

At step 310, after substitution of the object code (or substitutions of SWIs) has been made, the app security program prepares the security wrapped app for execution on the mobile device. The object code substituted into the app by the security program generally provides a bridge or connection between the app and the mobile device operating system. The security program class files may be described as wrapping around the operating system class files. The app security program class files are generated based on the policies created earlier (by input from the governor). The app is essentially re-wired for execution on the handset. It is re-wired to use the app security program layer in addition to the security provided by the mobile device operating system layer. That is, the secured app may still be subject to the security provisions of the operating system. In one embodiment, certain cosmetic changes may also be made to the app, such as changing the icon for the app to reflect that it is secured. By doing this, the user can be sure that when the app icon appears on the handset screen that the secured version of the app will be executed. The app has now essentially been re-factored or re-programmed by the security program.

At step 312 the app is signed with a new key, for example, with the key of the service provider or the key of the enterprise providing the secured app. The re-factored, secured version of the app is returned to the handset device. In another embodiment, the app is wrapped with the security layer on the phone. At step 314, in one embodiment, the original, unsecured copy of the app is deleted from the handset device. This may be done by the secured version of the app once it is downloaded onto the handset. In other embodiments, this is not done and both versions remain on the mobile device. At this stage the process is complete.

Figure 4:
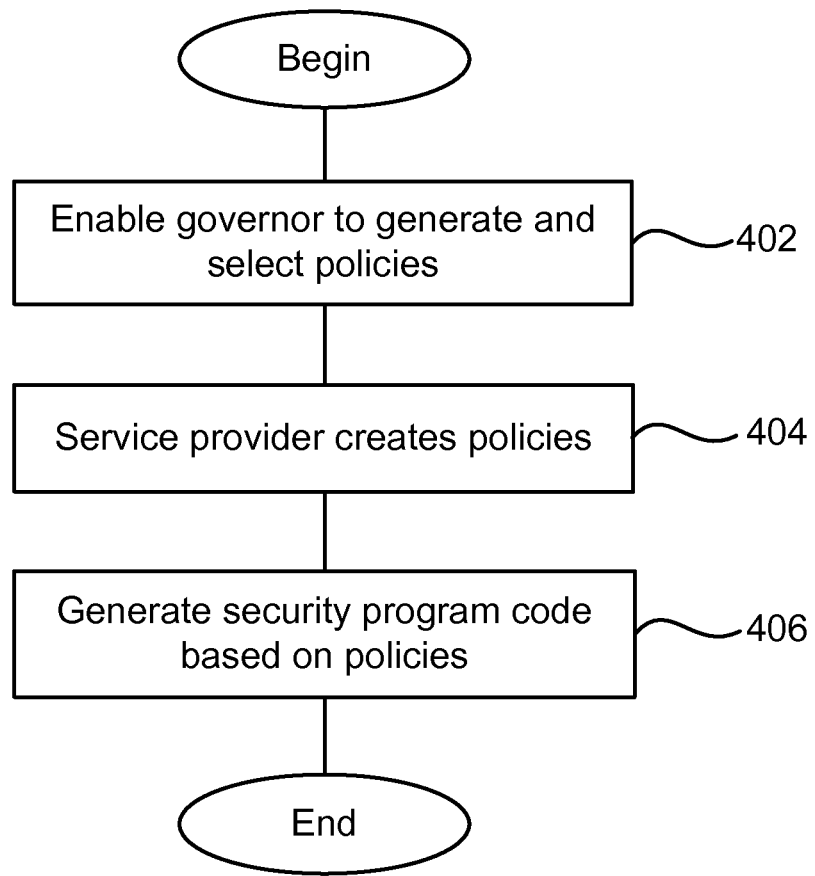
FIG. 4 is a flow diagram of a method performed in policy manager in accordance with one embodiment.

FIG. 4 is a flow diagram of a method performed in policy manager 202 in accordance with one embodiment. At step 402 the governor or other security policy individual is enabled to define, generate, and create security policies. This may be a network administrator for an enterprise deciding a vast array of mobile device security policies for hundreds of employees using dozens of enterprise apps (specifically for work) that may be downloaded on hundreds or thousands of mobile devices. On the other end of the spectrum, it may be a parent who is setting security policy for three or four apps downloaded by her child on a new mobile device. Other examples include preventing or squashing a gaming app using GPS, preventing an app from using a microphone on the device to record or eavesdrop on a conversation, among many others. In either case, the governor may take into consideration the category of the app, the type and nature of app, the author, the age-appropriateness, and numerous other factors. For example, has the same author written any other apps that may have been classified as malware or posed a security threat to the device. It may determine whether there are other apps by the same author. It is at this stage that the governor decides which rules to apply for each app. In one embodiment, this is done off-line by the governor. That is, it may be done using user interfaces on a home computer or on an enterprise network computer used by an administrator where security templates provided by the security program service provider (essentially default templates) may be used or very specific rules may be set using the templates.

At step 404 the security data input at step 402 is used by the app control security program to create the actual policies. At step 406 the app control security program object code is generated based on the input from the governor regarding security policies created at step 404. The governor or service provider may also update existing security policies if needed. As described above, the object code may be used to enhance certain original object code obtained from the disassembled app. The enhancement code is inserted to adjust security and privacy settings for an app in order to protect the enterprise and end user. The original app's behavior is altered which allows the governor to control how the app behaves. For example, if an app stores sensitive account information in the clear (i.e., un-encrypted), the behavior could be changed so that all information the app creates is stored in encrypted form and which can only be accessed by that app given that the key to the stored, persistent data would be unique to the app. In many instances the enhancement code can improve the apps performance since the code is optimized for a particular use scenario.

Figure 5:
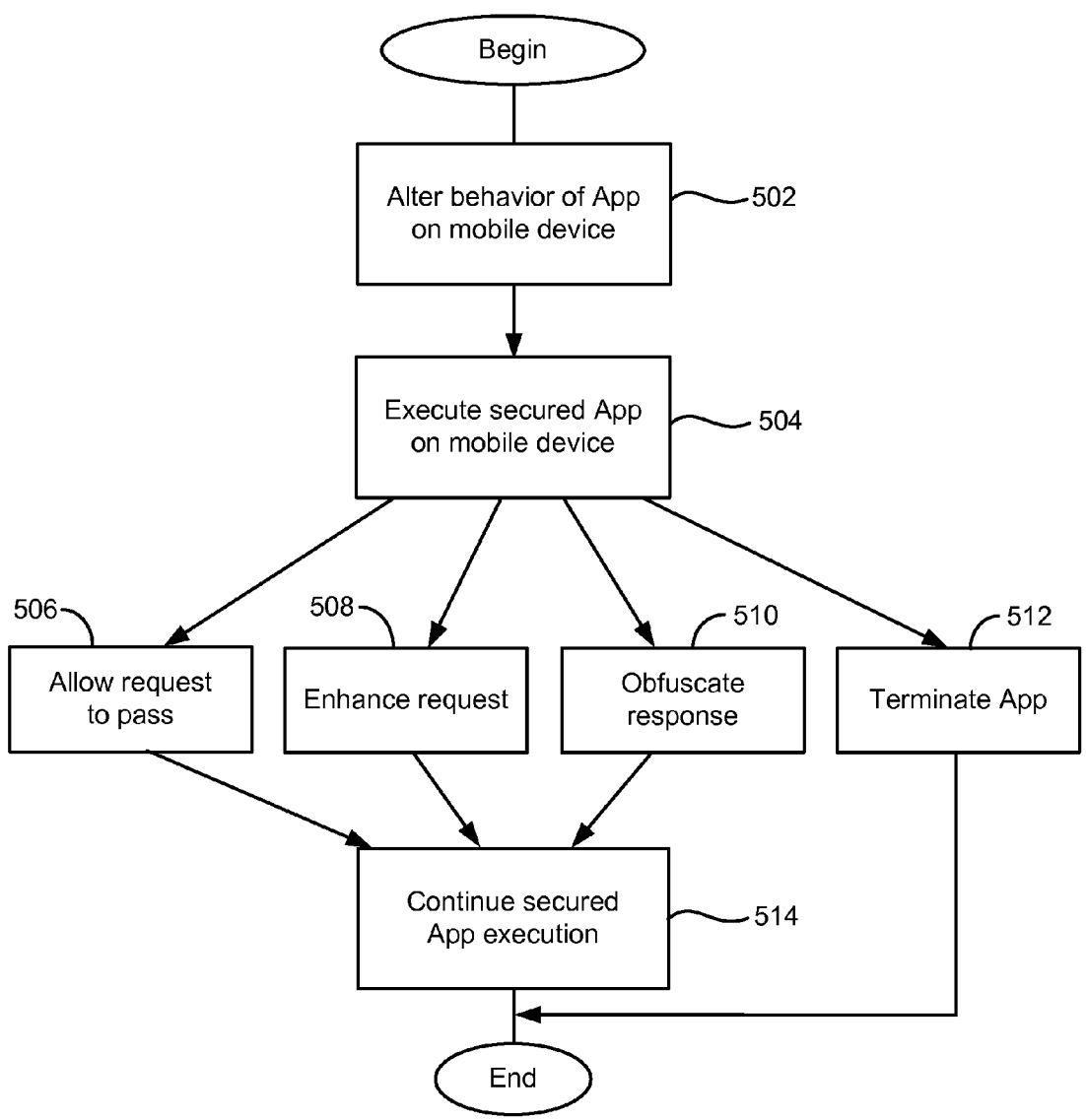
FIG. 5 is a flow diagram showing a process of a security-wrapped app executing on a handset or mobile device in accordance with one embodiment.

FIG. 5 is a flow diagram showing a process of a security-wrapped app executing on a handset or mobile device in accordance with one embodiment. At step 502 the behavior of the app when the app executes or immediately before it executes on the device is altered or modified. For example, behavior modification may include authentication during app initialization; e.g. smart/CAC card, or password challenge. Some apps, as originally designed, may not require a password for security, however, a secured version of an app which has been modified may require that the user enter a password. At step 504 the secured app executes on the mobile device by the user activating it (e.g., tapping on the icon if the device has a touch screen). Upon execution of the app, in one embodiment, control can take one of four options. As is known in the art, when an app executes, it makes calls or requests to the device operating system in order to carry out its functions. In many cases these calls may be harmless or pose no significant security threat to the phone or device. If this is the case, the call may be allowed to pass to the operating system as shown in step 506. Here the call is made to the device operating system and the app executes in a normal manner.

If the security layer or wrapper around the app detects that the app is making a request that may pose a security threat to the device, the app security layer may enhance or modify the request before it is passed to the operating system or other software or hardware component in the phone. This is shown at step 508. In one embodiment, the governor determines which calls are permissible by examining the one or more policies. For example, the governor may determine that all data should be saved in encrypted form. In another example, the governor may decide that only a select group of trusted apps should have data on a soldier's GPS coordinate. In one embodiment, there is no runtime logic to determine what is safe, a potential threat, or an actual threat; it is essentially pre-declared by the governor in the policy created at step 404 above. In another embodiment, there may be some runtime logic. For example, an app may be trying to send out expensive SMS text messages. The app control program may determine this and block the app from sending more than a certain number of text messages, for example, it may limit it to transmission of one message. The enhancement may be adding something new, such as a password requirement. In another example, if the call is to save data on the mobile device memory, the secured app may actually back up the data to a storage area in the cloud or on the Internet (i.e., off the device). In another example, the data related to the call may be encrypted.

At step 510 the secured app may determine that the call is an actual threat and should be dealt with in a more severe manner than at step 508. For example, it may have decided that based on the policy for an app, that if a camera on the device is accessed while in a secure building (e.g., the Pentagon), the app should immediately be terminated. Merely enhancing the request may not be sufficient in this case. At step 510, the request may not be allowed to proceed to the operating system or any other component of the device. However, in one embodiment, a response is returned to the app, but that response is intentionally not accurate or correct. It is essentially an obfuscated response. For example, it may be a GPS coordinate that is not the actual physical coordinate of the device (e.g., the device is in California, but the GPS coordinate that is returned to the app is a coordinate in Nebraska). This may be desirable when apps are used by children. Other examples may be returning bad or garbled data results if an app that should only run within a restrictive environment (e.g., a secure office area) is determined to be running outside that environment (e.g., at home). In this example, the app may be partially crippled so that the app can only access unclassified data and wherein classified information is nullified. In another example, when a user is attempting to paste or copy sensitive data from a classified app to a non-classified app, the app control program may change the copy of the data that is being pasted to garbage or essentially make it meaningless. After either steps 506, 508, or 510 have completed, the security-wrapped app continues execution on the mobile device at step 514.

At step 512 the security layer around the app has determined that the call being made by the app or that the app execution behavior in general poses too high a security threat level to the mobile device. In this extreme case, the security layer decides to terminate execution of the app and/or delete the app. For example, the app may be using too many resources on the phone, such as bandwidth, or is making too many high-risk calls to the operating system thereby over-exposing the mobile device. In this case, the app can simply be deleted from the phone or the app may be terminated. The user may not be able to re-execute it or re-install it. For example, an employee may not install that app again on the company phone because it was exposing sensitive company data. Or it may be determined that an app is secretly collecting data on the phone or installing malware.

Figure 6:
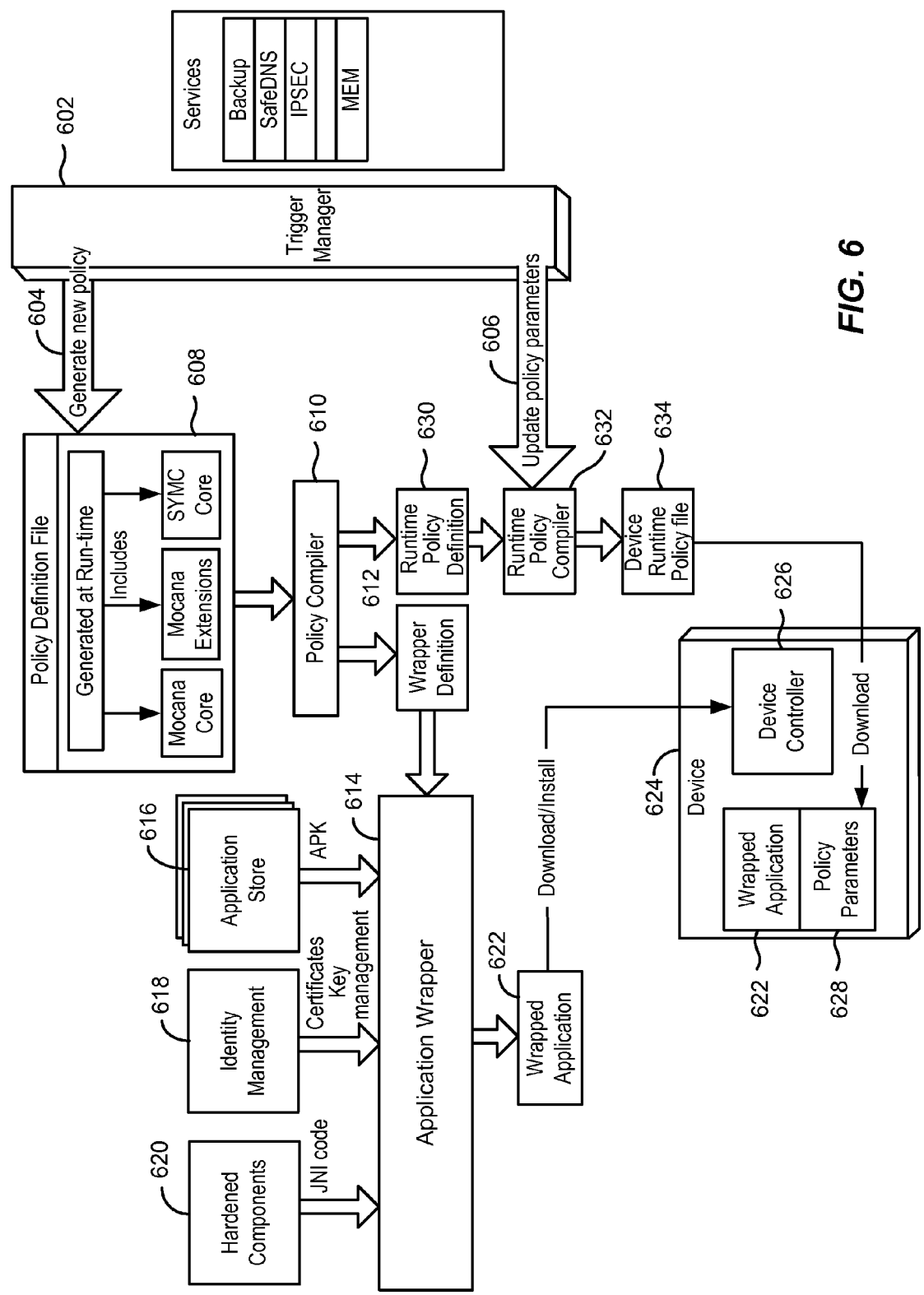
FIG. 6 is a system architecture diagram of the app security control system in accordance with one embodiment.

FIG. 6 is a system architecture diagram of the app security control system in accordance with one embodiment. A trigger manager component 602 handles two events, one for generating a new policy 604 and another for updating policy parameters 606. Such events can be triggered by various systems. For example, a console administrator or governor might apply a new policy to all devices (a manual operation). Or a network monitoring application, after detecting suspicious traffic originating from a device (or app), could push a new policy that would prevent a user/device/app from accessing network resources (an example of an automated operation). The various systems or entities that have the authority to change/update polices, do so through the trigger manager 602.

New policy output 604 is input to a policy definition file 608 which may be generated at runtime and may include various types of code and extensions, for example, specific to the app control service provider, or to the app/user/device the policy applies to. Policy definition file 608 is input to a policy compiler 610 which has two outputs. One output is a wrapper definition file 612. This file is input to an app wrapper component 614. App wrapper component 614 is responsible for generating secure app by injecting custom binary code (native or bytecode) into an app, downloaded directly, for example, from an app store. Or the app could be an app the user downloaded on to his device, and then uploaded to an "AppControl" server.

App wrapper component 614 may have three inputs: apps from one or more app stores 616, certificate key management data from identity management component 618, and hardened components 620. Key management data is used to tie the identities of the user, device, and the app, and ensure that any operation subject to policy control can be tied to a specific user/device/app. This also ensures that a wrapped application can only be run on a specific device to prevent a malicious app from circumventing policies and hardened components 620 (for example "Device security framework"). The output from app wrapper 614 is a wrapped app 622 which is downloaded or installed onto mobile device 624 via the device's controller 626. Device controller 626 responsibilities include: download app from the app wrapper; ensure that app running on the devices are appropriately wrapped apps (e.g., app wrapped for user1 should not be installed/run on device for user2); report list/version of installed applications to allow the management console to control policies for each device/user/application; and download policy parameters when appropriate. Wrapped app 622 resides on device 624 coupled with policy parameters 628.

Returning now to policy compiler 610, the other output is a runtime policy definition file 630. This file is input to a runtime policy compiler 632 which also accepts as input policy parameters 606 (specified by the management console, or other subsystems). Output from compiler 632 is a device runtime policy file 634. This file 634 is downloaded onto device 624 as shown as policy parameters 628, and is used to customize the policies applied to wrapped app 622.

Described below are various use cases and capabilities of the app control security program of the present invention. One use case involves the separation of work life and personal life on a mobile phone. There are apps for the user's personal use and apps that the user's employer (or a business partner of the employer) may have provided and the apps operate on the same phone, which is often the user's personal phone. The governor who determines security of the apps that need to be secured on the user's phone may block copy/paste operations between apps (such as e-mail apps). The governor may set policies for the work-related apps that perform selective wipes of apps and associated files. User location-based policies may also control where certain apps may execute. Examples of levels of protection because of malware are denying access to contacts, denying transmission of SMS without consent, and the like.

Another example of a use case is app control. Using the present invention, white and black listing of apps may be implemented, as well as full deletion of apps according to the policies set by a governor. An app may be 'sandboxed' to protect the other apps, software, and hardware of the device. Other capabilities may include identity-based control of apps or services and highly granular control over app behavior. Trojan identification is another use case that can be implemented with the app security program. For example, each app and content may be encrypted to prevent rogue apps from gaining access to and stealing confidential data on the phone. The security program may also be able to identify anomalous system call behavior of an app to identify malicious Trojan apps that act outside of their published intent.

Another use case is back-up and recovery of app data in which IT security administrators and governors have data revision control and can implement app and device content migration through back-up and restore operations. In another use case is network traffic monitoring. The app on the mobile device may be brought under the visibility of existing enterprise IDS/IPS/Web filtering infrastructure to allow for inspection and control of app communications. The app security program can also integrate with third-party DNS services, such as Symantec's DNS service to identify malware. All app communications may be encrypted, including communications at the mobile phone service provider. Other use cases include session continuity, consumer privacy (e.g., GPS obfuscation, implementing safe DNSs), and intercepting payment/transaction messages from the mobile device (i.e., operating in the middle of mobile commerce streams).

In one embodiment, the app security service is offered by a third-party service provider, for example, to make apps used by end-users or individuals (i.e., users not associated with an employer or enterprise). For example, a parent may want to obfuscate the GPS of a child's phone because the parent does not want a social network site, such as Facebook, to know where the child is, essentially disabling GPS. In another embodiment, an app store, operated by a wireless phone carrier (e.g., Verizon, AT&T) may offer a secured app for an extra charge or premium. A customer of the carrier can download the secured app from the marketplace or online store instead of the unsecured version by paying an extra amount. In another embodiment, an enterprise may have its own app store for its employees, partners, and the like, where users can only download secured versions of the apps (which may be referred to as "hard" apps). These apps may have many of the security features described above as defined by a governor (security administrator) at the enterprise, such as blocking copying and pasting e-mail or corporate data, killing an app from the user's phone if the user leaves the company, and so on. A mobile phone carrier's DNS can typically access any site, but the app security program can block a mobile device browser so that it can access only a safe DNS (e.g., Symantec's DNS) from where only safe Web sites may be accessed. In another embodiment, the app security program provider can work with the mobile device manufacturer to incorporate the app security program or functionality into the hardware and software operations of the device. In this embodiment, described below, a user can download an unsecured app and make is secured on the phone or device itself before executing and does not have to access a third-party service to have the app secured or ensure that the app is secured before being downloaded onto the device.

As can be seen from various embodiments described above, the security of the mobile device extends beyond the device itself and is applied directly to the apps that are downloaded onto the device. Companies and other entities are able to take advantage of apps more freely without having to worry about the security risks, such as data leakage or malware infection of the company's enterprise IT system. Companies can maintain governance of its corporate data.

In one aspect of the present invention, policies can be grouped or categorized in policy gates which facilitate app development, specifically, for app developers to write policies and have them implemented when an app executes. In some embodiments, when a new policy is introduced to the app wrapping software, the policy has to be hard-coded into the wrapping software. The software provider presently has to hard code the new policy into the app wrapping program that the provider sells, for example, to enterprises. In these embodiments, this requires a change to the main control flow and possibly to other segments in the app wrapping software. It is not unusual for this type of change or update to the main control flow to cause issues in the wrapping software such as unexpected side effects, unpredictable behavior, or errors and bugs. Such a change will likely also require re-testing of the app wrapping software program. In some embodiments, having to manually insert a policy into the wrapping program is generally undesirable because it makes the program code more brittle, more prone to unexpected execution, and more error prone.

In one aspect of the present invention, policies are conceptualized into generic categories or sets referred to herein as policy gates. By using policy gates, policies do not need to be hard-coded into the app wrapping software. When a new policy is written, either by the app wrapping software provider or by an enterprise using the app wrapping software, the new policy is put in an existing policy gate or a new policy gate is created for the new policy if the policy does not logically fit into the existing policy gates. In some embodiments, any new policy gates created are inserted into a policy gate list, maintained by a policy gate manager (not to be confused with the policy manager in the app wrapping software as described earlier in the application). In one embodiment, each new policy is stored in an existing or new policy gate. In various embodiments, the details and specifics regarding each policy are removed from the app wrapping code and put in a portable component called the policy gate. This makes it possible for an enterprise or other customer of the app wrapping software provider to write their own policies and have these policies injected into the app at runtime. It also allows them to implement new policies and to not have to change the code or the main control flow of the app wrapping software itself.

The following is an example implementation of an app wrapping security program using policy gates as implemented on an Android device. When an Android app begins execution, a series of checkpoints occur in the operating system. This is also true in iOS. The operating system/platform provides certain "hooks" to the app. These hooks inform the app of which part of the app execution life cycle the app is in. For example, one checkpoint is initializing or setting up the app. In such an example, the operating system, through the policy gate manager, tells the app that the app is starting up and asks the app: "What would you like to do now?" The app then checks to see what its default settings are in response. In another example, the hook or lifecycle state of the app may be the event "go to background." As with the initialization example, the operating system asks the app what it would like to do now that it is in a particular state or checkpoint in the life cycle. Once again, the app decides what to do, and in making this decision looks at its default settings. In addition, the app may use the services of the operating system, for example, location services, in response to the inquiry by the operating. In various embodiments, the app will want to know "Where am I now in the life cycle?" in order to make the appropriate function calls, such as to a network or to the operating system.

In some embodiments, policy gates are implemented in a mobile device operating under Android. When the app executes, the policy is injected into the app during runtime. When the app is started, a policy gate manager goes through each policy gate (using a policy gate list) which, in one embodiment, implements a new policy. The policy gate manager goes down the list of policy gates. In some embodiments, the policy gate manager is the module that tells the app which checkpoint the app is in (e.g., the app is initializing) and tells the app "proceed with doing what is needed to execute normally." For example, the app may display in landscape, portrait, or full-screen mode. In other examples, the app may need to call the operating system for services, such as location services or accessing secure data storage.

In some embodiments, there is a customized policy gate having a custom UI that the policy gate manager is able to interpret. At any given time in the app life cycle, each policy gate is aware of which stage the app is in. As noted, a policy gate manager goes to each policy gate and lets each one know which checkpoint has passed and, if needed, to call the appropriate function(s) (e.g., if the checkpoint is initialization, then the policy gates can each call an initialization function, if needed). Not every policy gate may have a function to call for each checkpoint in the app's lifecycle. If there is a function to call, each policy gate will execute that function and proceed. For example, each policy gate will initialize itself (assuming each policy gate has an initialization function to call).

As noted, the policy gate manager goes to each policy gate at the time of each checkpoint in the app's lifecycle. Another example of a checkpoint may be when an app goes to background (is no longer shown on the device screen). At this checkpoint, a policy gate may have a function it needs to call in order to adjust the display of the app. As noted above, the policy gate manager is the module between the policy gate and the wrapped app. The policy gate manager makes a function call to a policy gate. The policy gate manager also controls what the user can or cannot do at any particular time. For example, it can block user activity on the app.

In some embodiments, each policy gate has one policy. In other embodiments, policies can be grouped into categories (or buckets), with each category of policies being under one policy gate. In some embodiments, a policy gate can tell the policy gate manager (operating between the policy gate and the app) to prevent a user from using an app during a certain period. The policy gate manager makes function calls to the operating system and provides services and context to the policy gates (examples, as noted above, location services, current state of app wrapping program, access to secure data storage, etc.). With respect to grouping policies, certain policies share an underlying commonality that makes them prone to being grouped into families. A few examples include authentication related policies (e.g., policies that use VPN, biometric, passphrases, and the like), data leakage prevention-related polices (e.g., copy/paste, email/SMS/camera/social media enforcement, and the like), and location policies (e.g., geo-fencing policies). A category of policies contains policies that use the same or similar services from the operating system, that is, have a set of common services. For example, if there is a new authentication policy (e.g., an employee has to have a fingerprint scan in order to use an app) that an enterprise wants to use with the app wrapping software, the enterprise app developers could get the base authentication policy code/implementation from the appropriate policy gate and then add/create the specific fingerprint scanning code. In such embodiments, the app developers would not have to write the whole fingerprint scanning authentication policy from scratch and have it hard-coded into the app wrapping software. The app developers could use a base authentication code, such as the code for managing the keystore, and not have to re-write code for the policy that is substantially common with other authentication policies. In some embodiments, each category is represented by one policy gate. In other embodiments, a category can be represented by multiple policy gates.

The following is an example implementation of an app wrapping security program using policy gates as implemented on an iOS device. In some embodiments, the concept of policy gates may be implemented in an iOS environment.

Figure 7:
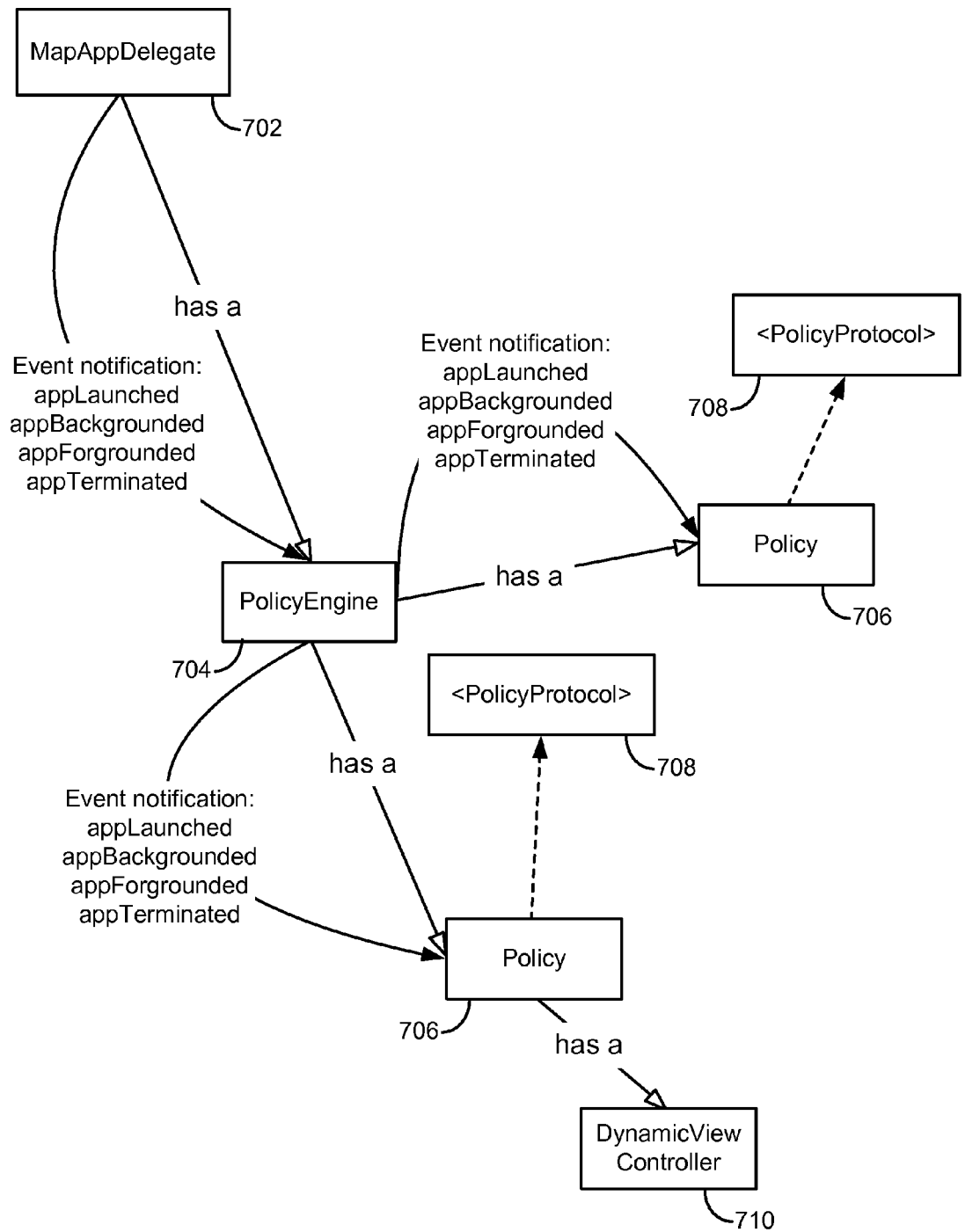
FIG. 7 is a block diagram illustrating an example of an app wrapping security system implemented using policy gates or policy components in accordance with one embodiment.

FIG. 7 is a block diagram illustrating an example of an app wrapping security system implemented using policy gates or policy components in accordance with one embodiment. In this particular example, the system runs in an iOS environment. However, as described above, in some embodiments, an analogous system running in an Android environment can also be implemented using analogous principles and features to those presented in FIG. 7. A component, referred to as MapAppDelegate 702, is a core delegator of events in the policy gate implementation. MappAppDelegate 702 also receives calls from the operating system (iOS) of the device. MappAppDelegate 702 has functionality similar to the main control flow code in an app wrapping security program in the Android example. In some implementations, in an iOS device, "events" in an app lifecycle represent checkpoints in the app lifecycle. These events include "become active," "backgrounded," "foregrounded," "terminated," "display UI," "dismiss UI," and "app launched." In some embodiments, MapAppDelegate 702 captures these and other events in the app lifecycle. Presently, in some embodiments, all policies are launched from MapAppDelegate 702. As such, it experiences the same issues as the main control flow in the Android example. For example, such embodiments can get cluttered and unwieldy. It becomes difficult to manage and update policies without causing errors and unwanted or unexpected side effects to the operation of the MappAppDelegate 702. Furthermore, from a program design perspective, adding and launching all policies from MapAppDelegate 702 does not take advantage of object oriented design principles which would make the code more efficient, easier to manage, and elegant.

In some embodiments, there is a policy engine that is in communication with the MappAppDelegate 702. In the particular example shown in FIG. 7, MappAppDelegate 702 has a policy engine 704 with which it communicates. Specifically, MappAppDelegate 702 sends notifications to the policy engine 704 whenever an event (appLaunched, appBackgrounded, etc.) occurs in the app lifecycle. In some embodiments, policy engine 704 may be described as a container for all policies. In some embodiments, policy engine 704 has analogous function to the policy gate manager as previously described. In some embodiments, MappAppDelegate 702 does not have to include any existing or new policies. In some embodiments, policy engine 704 has one or more policy components 706. In some embodiments, policy components 706 have analogous functions to policy gates, as described above. In FIG. 7, Policy engine 704 in turn notifies multiple (one or more) policy components 706 of each event at each event. In some embodiments, a policy component 706 contains a policy abstract class, similar to the categories mentioned above. All policies within a policy component 706 conform to a certain behavior representative of the policy abstract class and inherit from policy component 706, policies of a certain category in a policy gate in the Android example. In some implementations, each policy component 706 contains a policy protocol 708. Each policy protocol 708 is the same for each policy abstract class in a policy component 706. Each policy abstract class may be specific to a particular category of policies as described above, such as authentication, location services, data leakage prevention, and the like. In some embodiments, a policy abstract class in a policy component 706 is notified by policy engine 704 when app lifecycle events occur that would normally be handled by the MapAppDelegate 702. In some embodiments, certain policy components 706 include a dynamic view controller 710 that can be used for flexible monitoring and management. The block diagram in FIG. 7 represents one example of a system and method for implementing an app wrapping security program that also allows for extensible policy creation.

Figure 8:
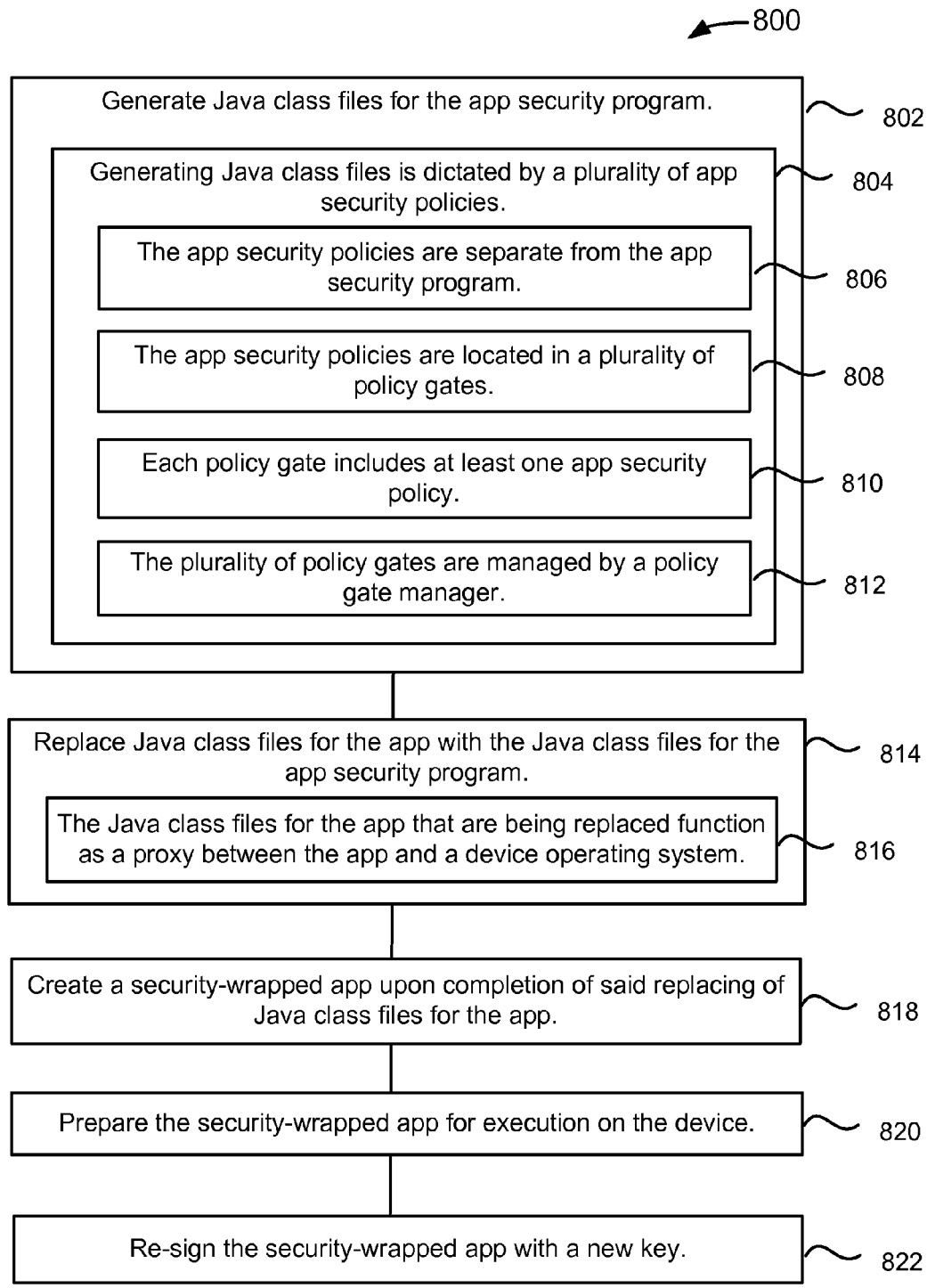
FIG. 8 is a flow diagram of a method securing an app for execution on a device using an app security program using policy gates in accordance one embodiment.

FIG. 8 is a flow diagram of a method 800 for securing an app for execution on a device using an app security program using policy gates in accordance with one embodiment. Method 800 begins with generating (802) Java class files for the app security program. In some embodiments, generating the Java class files is dictated (804) by a plurality of app security policies. In some embodiments, the app security policies are separate (806) from the app security program and located (808) in a plurality of policy gates. Each policy gate includes (810) at least one app security policy. In some embodiments, the plurality of policy gates is managed (812) by a policy gate manager.

Next, method 800 includes replacing (814) Java class files for the app with the Java class files for the app security program. In some embodiments, the Java class files for the app that are being replaced function (816) as a proxy between the app and a device operating system. Next, method 800 includes creating (818) a security-wrapped app upon completion of said replacing of Java class files for the app. The security-wrapped app is then prepared (820) for execution on the device. Last, method 800 concludes with re-signing (822) the security-wrapped app with a new key.

In some embodiments, a new app security policy is added to an existing policy gate in the plurality of policy gates. In other embodiments, a new policy gate is added to the plurality of policy gates in order to store a new app security policy. In some embodiments, the app security policies are not hard-coded in the app security program such that the app security program does not include details and specifics regarding any app security policy. In some embodiments, each app security policy in a policy gate includes an underlying commonality with all other app security policies in the same policy gate. In some embodiments, the policy gate manager goes, during execution of the security-wrapped app on the device, to each policy gate and lets each policy gate know in which checkpoint or event in an execution life cycle the security-wrapped app is in. In some embodiments, a policy gate calls an appropriate function in response to being notified by the policy gate manager of a certain checkpoint or event in the execution life cycle of the security-wrapped app.

Each of the operations shown in FIG. 8 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Figure 9A:
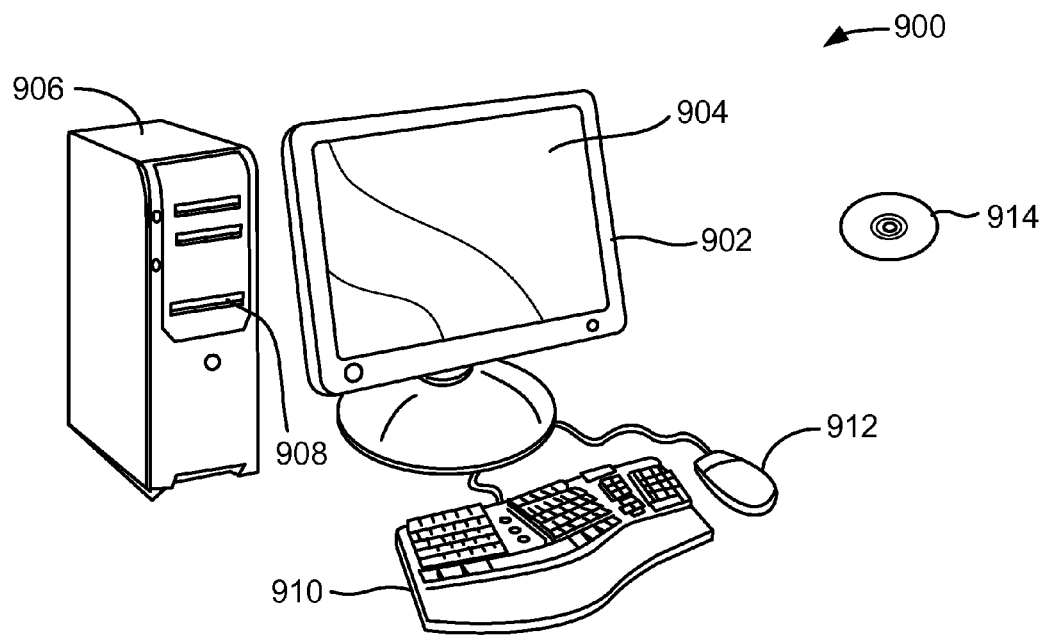
FIGS. 9A and 9B are block diagrams of a computing system suitable for implementing various embodiments of the present invention.
Figure 9B:
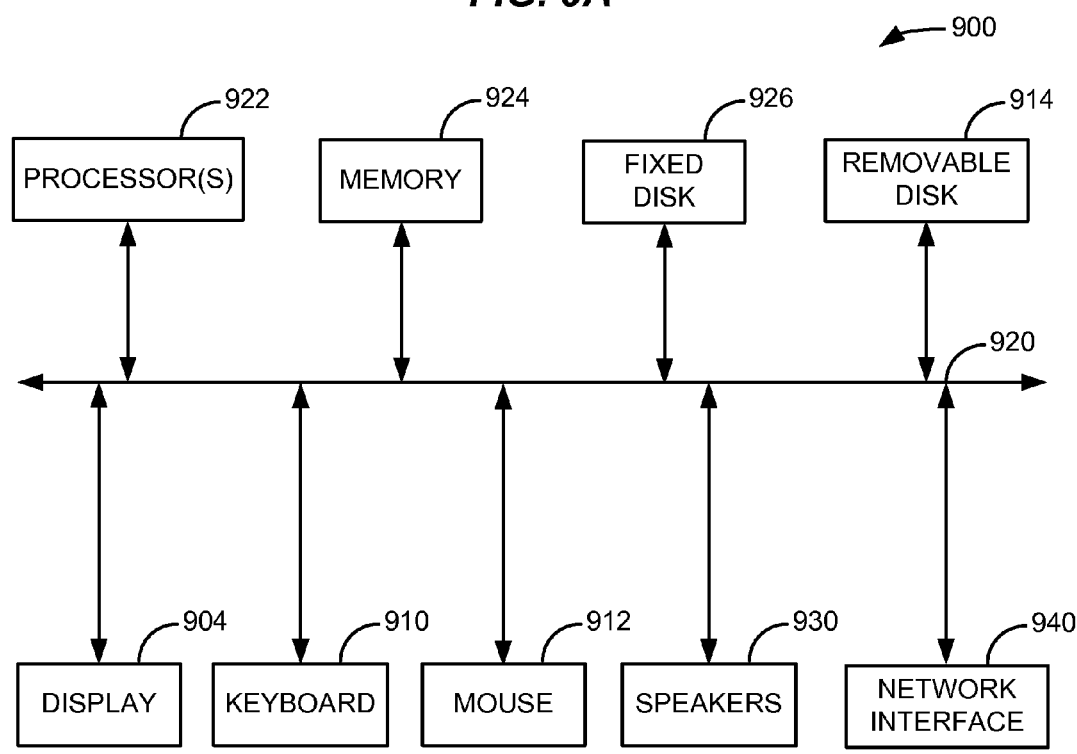

FIGS. 9A and 9B illustrate a computing system 900 suitable for implementing embodiments of the present invention. FIG. 9A shows one possible physical form of the computing system. Of course, the computing system may have many physical forms including an integrated circuit, a printed circuit board, a small handheld device (such as a mobile telephone, handset or PDA), a personal computer or a super computer. Computing system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computing system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method of securing an app for execution on a device using an app security program, the method comprising:
   generating Java class files for the app security program, said generating dictated by a plurality of app security policies separate from the app security program and located in a plurality of policy gates, each policy gate including at least one app security policy, the plurality of policy gates managed by a policy gate manager, wherein said policy gate manager informs each policy gate of each checkpoint that occurs during an execution lifecycle of the security-wrapped app and wherein each policy gate calls a function in response to the checkpoint;

replacing Java class files for the app with the Java class files for the app security program, wherein the Java class files for the app that are being replaced function as a proxy between the app and a device operating system;

creating a security-wrapped app upon completion of said replacing of Java class files for the app;

preparing the security-wrapped app for execution on the device; and re-signing the security-wrapped app with a new key.

2. The method of claim 1, wherein a new app security policy is added to an existing policy gate in the plurality of policy gates.

3. The method of claim 1, wherein a new policy gate is added to the plurality of policy gates in order to store a new app security policy.

4. The method of claim 1, wherein the app security policies are not hard-coded in the app security program such that the app security program does not include details and specifics regarding any app security policy.

5. The method of claim 1, wherein each app security policy in a policy gate includes an underlying commonality with all other app security policies in the same policy gate.

6. A system for securing an app for execution on a device using an app security program, the system comprising:

memory storing the app security program; and a processor configured to:

generate Java class files for the app security program, said generating dictated by a plurality of app security policies separate from the app security program and located in a plurality of policy gates, each policy gate including at least one app security policy, the plurality of policy gates managed by a policy gate manager, wherein said policy gate manager informs each policy gate of each checkpoint that occurs during an execution lifecycle of the security-wrapped app and wherein each policy gate calls a function in response to the checkpoint;

replace Java class files for the app with the Java class files for the app security program, wherein the Java class files for the app that are being replaced function as a proxy between the app and a device operating system;

create a security-wrapped app upon completion of said replacing of Java class files for the app;

prepare the security-wrapped app for execution on the device; and re-sign the security-wrapped app with a new key.

7. The system of claim 6, wherein a new app security policy is added to an existing policy gate in the plurality of policy gates.

8. The system of claim 6, wherein a new policy gate is added to the plurality of policy gates in order to store a new app security policy.

9. The system of claim 6, wherein the app security policies are not hard-coded in the app security program such that the app security program does not include details and specifics regarding any app security policy.

10. The system of claim 6, wherein each app security policy in a policy gate includes an underlying commonality with all other app security policies in the same policy gate.

11. A non-transitory computer readable medium including instructions for:

generating Java class files for the app security program, said generating dictated by a plurality of app security policies separate from the app security program and located in a plurality of policy gates, each policy gate including at least one app security policy, the plurality of policy gates managed by a policy gate manager, wherein said policy gate manager informs each policy gate of each checkpoint that occurs during an execution lifecycle of the security-wrapped app and wherein each policy gate calls a function in response to the checkpoint;

replacing Java class files for the app with the Java class files for the app security program, wherein the Java class files for the app that are being replaced function as a proxy between the app and a device operating system;

creating a security-wrapped app upon completion of said replacing of Java class files for the app;

preparing the security-wrapped app for execution on the device; and re-signing the security-wrapped app with a new key.

12. The non-transitory computer readable medium of claim 11, wherein a new app security policy is added to an existing policy gate in the plurality of policy gates.

13. The non-transitory computer readable medium of claim 11, wherein a new policy gate is added to the plurality of policy gates in order to store a new app security policy.

14. The non-transitory computer readable medium of claim 11, wherein the app security policies are not hard-coded in the app security program such that the app security program does not include details and specifics regarding any app security policy.

15. The non-transitory computer readable medium of claim 11, wherein each app security policy in a policy gate includes an underlying commonality with all other app security policies in the same policy gate.

* * * * *